US010601953B2

United States Patent
Bajaj et al.

(10) Patent No.: US 10,601,953 B2
(45) Date of Patent: Mar. 24, 2020

(54) DECOMPOSING MEDIA CONTENT ACCOUNTS FOR PERSONA-BASED EXPERIENCE INDIVIDUALIZATION

(71) Applicant: Adobe Inc., San Jose, CA (US)

(72) Inventors: Payal Bajaj, Stanford University, CA (US); Sumit Shekhar, Bangalore (IN); Lakshmi Shivalingaiah, Berkeley, CA (US); George Horia Galatanu, Lafayette, CA (US)

(73) Assignee: Adobe Inc., San Jose, CA (US)

( * ) Notice: Subject to any disclaimer, the term of this patent is extended or adjusted under 35 U.S.C. 154(b) by 558 days.

(21) Appl. No.: 15/273,580

(22) Filed: Sep. 22, 2016

(65) Prior Publication Data

US 2018/0084080 A1 Mar. 22, 2018

(51) Int. Cl.
*H04L 29/08* (2006.01)
(52) U.S. Cl.
CPC ............ *H04L 67/327* (2013.01); *H04L 67/22* (2013.01); *H04L 67/306* (2013.01)
(58) Field of Classification Search
CPC ...... H04L 67/327; H04L 67/22; H04L 67/306
USPC ........................ 709/205, 206, 232
See application file for complete search history.

(56) References Cited

U.S. PATENT DOCUMENTS

| | | | | |
|---|---|---|---|---|
| 7,765,212 B2* | 7/2010 | Surendran | ............ | G06Q 10/107 707/738 |
| 2003/0182295 A1* | 9/2003 | Ukai | ....................... | G06F 17/00 709/100 |
| 2006/0143079 A1* | 6/2006 | Basak | ................ | G06Q 30/0204 705/14.1 |
| 2006/0280152 A1* | 12/2006 | Lee | ..................... | H04W 72/042 370/338 |
| 2008/0134043 A1* | 6/2008 | Georgis | ................... | H04N 7/10 715/733 |
| 2008/0301737 A1* | 12/2008 | Hjelmeland Almas | ..................... | H04N 5/445 725/61 |
| 2009/0006156 A1* | 1/2009 | Hunt | ..................... | G06Q 10/063 705/7.11 |
| 2010/0011020 A1* | 1/2010 | Bouzid | ................... | G06F 16/00 707/E17.046 |
| 2010/0076983 A1* | 3/2010 | Gates | ................... | G11B 27/105 707/749 |
| 2010/0306402 A1* | 12/2010 | Rusel | ..................... | G06F 15/16 709/231 |

(Continued)

OTHER PUBLICATIONS

"A Greedy Heuristic for the Set-Covering Problem", Mathematics of Operations Research, vol. 4, No. 3, Aug. 1979, 4 pages.

(Continued)

*Primary Examiner* — David R Lazaro
*Assistant Examiner* — Berhanu Shitayewoldetadik
(74) *Attorney, Agent, or Firm* — SBMC

(57) ABSTRACT

Various embodiments disambiguate users who share media content accounts to provide persona-based experience individualization. Personas correspond to commonly observed channel watching patterns among media content customers. Decomposition of the media content account into personas is achieved by analyzing many accounts, e.g., millions of accounts, on media content platforms. By analyzing accounts, a recommendation system can individualize the channel watching experience in media content accounts.

20 Claims, 8 Drawing Sheets

(56) References Cited

U.S. PATENT DOCUMENTS

| | | | | |
|---|---|---|---|---|
| 2011/0060738 A1* | 3/2011 | Gates | ................ | G06F 16/68 |
| | | | | 707/737 |
| 2012/0102410 A1* | 4/2012 | Geweck | ................ | G06F 3/01 |
| | | | | 715/738 |
| 2012/0195433 A1* | 8/2012 | Eppolito | ................ | H04S 3/008 |
| | | | | 381/1 |
| 2012/0233167 A1* | 9/2012 | Gates | ................ | G06F 16/68 |
| | | | | 707/737 |
| 2012/0254256 A1* | 10/2012 | Martin | ................ | G11B 27/034 |
| | | | | 707/803 |
| 2012/0254363 A1* | 10/2012 | Martin | ................ | G06F 16/435 |
| | | | | 709/219 |
| 2013/0157580 A1* | 6/2013 | Qiu | ................ | H04W 16/14 |
| | | | | 455/67.11 |
| 2013/0166561 A1* | 6/2013 | Georgescu | ................ | G06F 16/685 |
| | | | | 707/739 |
| 2013/0188757 A1* | 7/2013 | Kalyani | ................ | H04L 5/0048 |
| | | | | 375/340 |
| 2014/0075351 A1* | 3/2014 | Hansen | ................ | H04M 1/72547 |
| | | | | 715/765 |
| 2014/0123161 A1* | 5/2014 | Van Coppenolle | .... | H04N 21/81 |
| | | | | 725/34 |
| 2014/0379702 A1* | 12/2014 | Doddavula | ......... | G06F 16/9535 |
| | | | | 707/723 |
| 2015/0186535 A1* | 7/2015 | Patil | ................ | G06F 3/04817 |
| | | | | 707/710 |
| 2015/0245094 A1* | 8/2015 | Schneider | ........ | H04N 21/44016 |
| | | | | 725/34 |
| 2016/0012465 A1* | 6/2016 | Sharp | ................ | G06Q 30/02 |
| | | | | 705/39 |
| 2016/0274744 A1* | 9/2016 | Neumann | ............ | H04N 21/252 |
| 2016/0279414 A1* | 9/2016 | Schleich | ................ | A61N 1/0541 |
| 2017/0032384 A1* | 2/2017 | Harris | ................ | G06Q 30/0201 |
| 2017/0091849 A1* | 3/2017 | Greystoke | .......... | G06Q 30/0631 |
| 2017/0127132 A1* | 5/2017 | Shekhar | ................ | H04N 21/252 |
| 2017/0344852 A1* | 11/2017 | Hu | ................ | G06F 17/15 |
| 2018/0129908 A1* | 5/2018 | Gopalan | ................ | G06K 9/00 |

OTHER PUBLICATIONS

Agrawal,"Fast Algorithms for Mining Association Rules", In Proceedings of Very Large Data Bases 1994, 1994, pp. 1-32.

Aroyo,"Distributed Personalization: Bridging Digital Islands in Museum and Interactive TV", ERCIM News, (2008), No. 72, Jan. 2008, pp. 40-41.

Bellekens,"User Model Elicitation and Enrichment for Context-sensitive Personalization in a Multiplatform TV Environment", Proceedings of the 7th European Interactive Television Conference, Jun. 2009, pp. 119-128.

Frey,"Clustering by Passing Messages Between Data Points", Science Feb. 16, 2007: vol. 315, Issue 5814, Feb. 2007, pp. 972-976.

Han,"Mining Segment-Wise Periodic Patterns in Time-Related Databases", Proc. Int. Conf. on Knowledge Discovery and Data Mining, 1998, pp. 214-218.

Wang,"User Identification within a Shared Account: Improving IP-TV Recommender Performance", Advances in Databases and Information Systems. Springer International Publishing, 2014., Sep. 2014, 16 pages.

Yu,"TV program recommendation for multiple viewers based on user profile merging", User Model User-Adap Inter (2006), Jun. 2006, pp. 63-82.

Zhang,"Guess Who Rated This Movie: Identifying Users Through Subspace Clustering", 28th Conference on Uncertainty in Artificial Intelligence (UAI 2012), Aug. 2012, 10 pages.

* cited by examiner

| F | Channel 1 | Channel 2 | ... | Channel n |
|---|---|---|---|---|
| Account 1 | $f_{11}$ | $f_{12}$ | ... | $f_{1n}$ |
| Account 2 | $f_{21}$ | $f_{22}$ | ... | $f_{2n}$ |
| ... | ... | ... | ... | ... |
| Account m | $f_{m1}$ | $f_{m2}$ | ... | $f_{mn}$ |

Fig. 3

| M | Channel 1 | Channel 2 | ... | Channel n |
|---|---|---|---|---|
| Channel 1 | $m_{11}$ | $m_{12}$ | ... | $m_{1n}$ |
| Channel 2 | $m_{21}$ | $m_{22}$ | ... | $m_{2n}$ |
| ... | ... | ... | ... | ... |
| Channel m | $m_{n1}$ | $m_{n2}$ | ... | $m_{nn}$ |

*Fig. 4*

DECOMPOSING MEDIA CONTENT ACCOUNTS FOR PERSONA-BASED EXPERIENCE INDIVIDUALIZATION

BACKGROUND

The media content distribution industry has seen a massive growth in the last few years. Unlike the traditional television and set top boxes, where content is available as per channel schedules, users can now access content, such as television program content, over the Internet using a multitude of devices at any time during the day.

As media content accounts generally supplement cable television connections, the accounts are typically shared across a household, and members of the household watch media content online through the same account. These members usually have varied channel preferences. For example, the teenagers in the house might prefer sports or news channels, whereas the younger kids might prefer cartoon channels. In such a situation, where multiple viewers with different viewing patterns are using the same account, tracking individual user behavior becomes a challenging problem as only account-level statistics are captured by standard data analytics methods.

This poses a challenge to personalization for media content accounts because making targeted channel recommendations can only be done only at the account level, and not at the individual level. For any effective personalization and engagement technology, differentiation for viewing characteristics of each individual in the family or relevant viewing group is important.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments disambiguate users who share media content accounts to provide persona-based experience individualization. Personas correspond to commonly observed channel watching patterns among media content customers. Decomposition of the media content account into personas is achieved by analyzing many accounts, e.g., millions of accounts, on media content platforms. By analyzing accounts, a recommendation system can individualize the channel watching experience in media content accounts.

In one or more implementations, patterns of channel access behaviors are analyzed to identify trends for people who share an account and improve the personalization experience. Shared accounts are decomposed by first grouping channels based on pairwise similarity between channels viewed by accounts. Then, frequently occurring channel clusters are extracted using association rule mining to provide final patterns. The final patterns represent distinct personas and accounts are then decomposed into these identified personas.

After having identified different personas within the accounts, a persona based individualized channel experience is provided. This is done by identifying the persona, using the account, in real-time when the session starts and then recommending channels viewed dominantly by that persona. This improves upon the traditional account-level similarity-based approach by providing a personalized experience driven by the identified persona.

BRIEF DESCRIPTION OF THE DRAWINGS

The detailed description is described with reference to the accompanying figures.

FIG. 3 illustrates an example matrix in accordance with one or more embodiments.

FIG. 4 illustrates an example similarity matrix in accordance with one or more embodiments.

DETAILED DESCRIPTION

Overview

Figure 1:
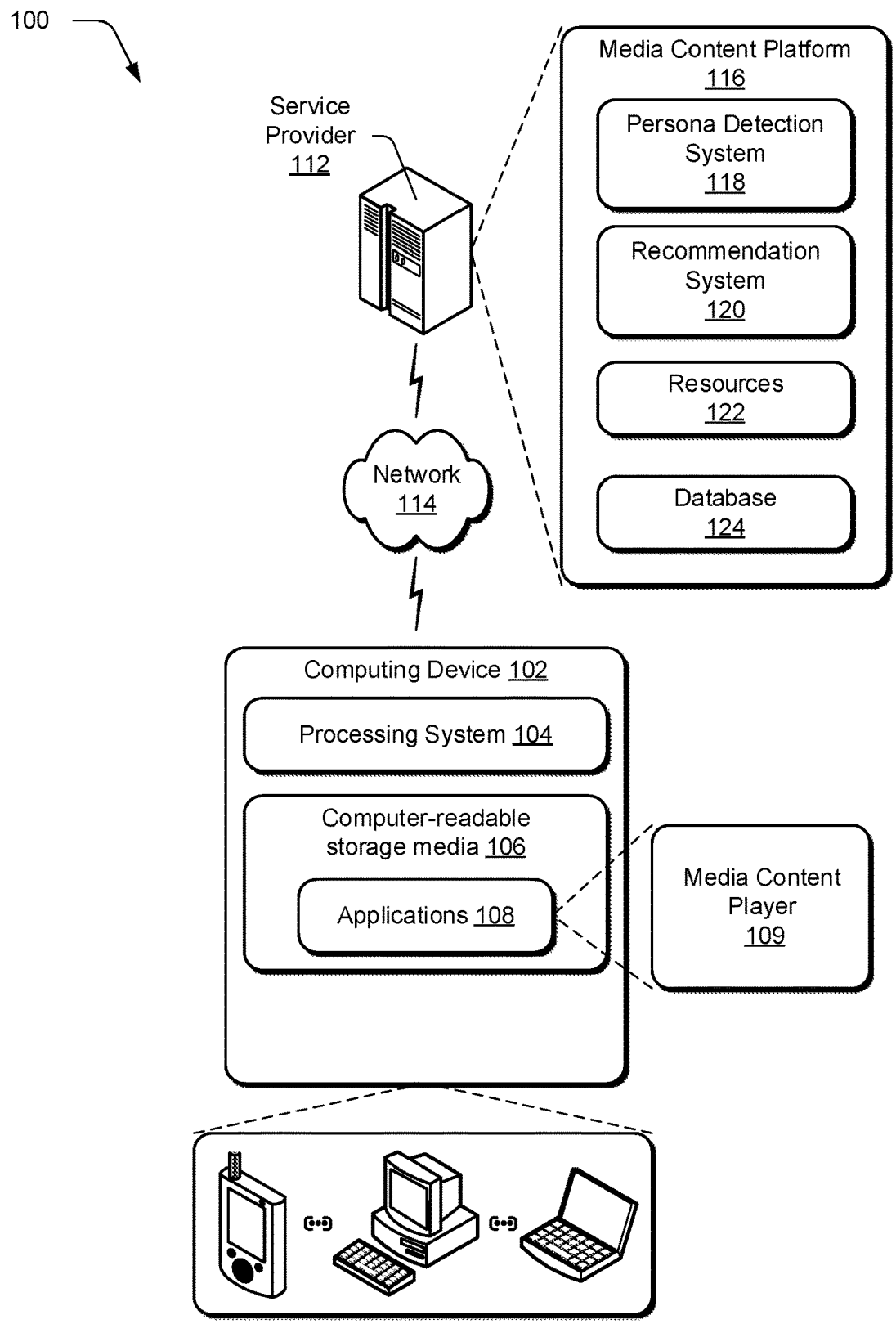
FIG. 1 is an illustration of a digital medium environment in an example implementation that is operable to employ techniques described herein.

Various embodiments disambiguate users who share media content accounts to provide persona-based experience individualization. For example, presently as well as in the past, channel recommendations for a media content account have only been able to be made at the account level, using viewing habit information derived from the account in general. Thus, with a shared account where individuals with different viewing habits view different types of channels, channel recommendations to the various individuals may not necessarily be consonant with the specific individual's viewing habits. For example, for a family that includes children who share a media content account, such as an online television account in which content can be viewed on multiple different devices, the father may not be interested in cartoon channel recommendations that are provided because of the children's viewing habits. Likewise, the children may not be interested in news channel recommendations that are provided because of the parents' viewing habits. To address this situation and to improve the user's experience, various embodiments described herein introduce the notion of a persona and use personas to provide a more individualized user experience. Thus, rather than making channel recommendations based only on channel watching patterns associated with the account, channel recommendations can be made based upon each persona that is identified to be associated with an account. Personas correspond to commonly observed channel watching patterns among media content customers. Decomposition of an individual media content account into personas is achieved by analyzing many accounts, e.g., millions of accounts, on media content platforms. By analyzing accounts to develop personas, a recommendation system can individualize the channel watching experience in media content accounts.

In one or more implementations, patterns of channel access behaviors are analyzed to identify trends for people who share an account and improve the personalization experience. Shared accounts are decomposed by first grouping channels based on pairwise similarity between channels viewed by accounts. Then, frequently occurring channel clusters are extract using association rule mining to provide final patterns. The final patterns represent distinct personas and accounts are then decomposed into these identified personas.

After having identified different personas within the accounts, a persona based individualized channel experience is provided. This is done by identifying the persona, using the account, in real-time when the session starts and then recommending channels viewed dominantly by that persona. This improves upon the traditional account-level approach by providing a highly personalized experience, even in shared accounts, driven by the identified persona. This, in turn, significantly improves the user experience and improves user engagement.

In one or more implementations, a digital medium environment includes a computing device that includes a media content platform configured to make channel recommendations. An improved channel recommendation method comprises determining, by the computing device, similarity in viewing behavior for channel pairs over multiple media content accounts; building, by the computing device, multiple clusters of channels by identifying channels having similarity values above a threshold value; processing, by the computing device, the multiple clusters of channels to define personas across the multiple media content accounts, wherein each persona pertains to a commonly viewed pattern; and decomposing, by the computing device, each of the multiple media content accounts into one or more personas, the personas being usable to facilitate channel recommendations to enhance a user's experience.

In the following discussion, an example digital medium environment is first described that can employ the techniques described herein. Example implementation details and procedures are then described which can be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein. In at least some implementations, applications 108 include or otherwise make use of a media content player 109. In some implementations, the media content player 109 is a standalone application. In other implementations, the media content player 109 is included as part of another application or system software such as a computing device's operating system. The media content player 109 is configured to enable video content, such as streaming video, video files, and the like, to be received, processed and consumed by a user of the computing device. The media content player 109 is also configured to receive and display content recommendations as described above and below.

Applications 108 may also include a web browser which is operable to access various kinds of web-based resources (e.g., content and services). In at least some implementations, the applications include one or more video players, such as Adobe® Flash® Player, a YouTube™-type application, and the like. In at least some implementations, the applications 108 represent a client-side component having integrated functionality operable to access web-based resources (e.g., a network-enabled application), browse the Internet, interact with online providers, and so forth. Applications 108 further include an operating system for the computing device 102 and other device applications.

The computing device 102 may be configured as any suitable type of computing device. For example, the computing device may be configured as a desktop computer, a laptop computer, a television, a mobile device (e.g., assuming a handheld configuration such as a tablet or mobile phone), a tablet, a camera, and so forth. Thus, the computing device 102 may range from full resource devices with substantial memory and processor resources (e.g., televisions, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The digital medium environment 100 further depicts one or more service providers 112, configured to communicate with computing device 102 over a network 114, such as the Internet, to provide a "cloud-based" computing environment. Generally speaking, a service provider 112 can include a media content platform 116 that can make media content available to various users via the computing device 102. The media content platform 116 can include any suitable type of media content platform including, by way of example and not limitation, a so-called "TV Everywhere" platform. TV Everywhere platforms are video delivery platforms over the Internet. These platforms are also referred to as authenticated streaming platforms or authenticated video on-demand platforms. These platforms provide access to streaming video content from the television channel and require authentication as a current subscriber to the channel Typically, users have an account, such as a household account, that is provided by their pay television provider. This account is used to access content and receive content recommendations as described above and below. TV Everywhere platforms, as well as other platforms, enable broadcasters to offer their customers an ability to access content from their channels through Internet-based services and mobile apps as part of their subscription to the service.

In the illustrated and described embodiment, the media content platform 116 includes a persona detection system 118, a recommendation system 120, various resources 122, and a database 124 that can be used to store resources such as channel logs described in more detail below.

The persona detection system 118 is representative of functionality that disambiguates users who share media content accounts to provide persona-based experience individualization. "Personas" correspond to commonly observed channel watching patterns among media content customers. Decomposition of the media content account into personas is achieved by analyzing many accounts, e.g., millions of accounts, on the media content platform 116. By analyzing accounts, recommendation system 120 can individualize the channel watching experience in media content accounts. This can be done by recommending content that corresponds to or otherwise is consistent with content types associated with an identified persona. So, for a shared account, i.e., an account with different users, a persona can be associated with each individual user of the account. For example, Dad may correspond to one persona, Mom may correspond to another persona, and their son Jimmy may correspond to yet a third persona. When any of these users begin to watch a program, the persona of the user can be ascertained as described below, and channel recommendations can be made based on the persona. Thus, when viewing programs, Dad receives channel recommendations that are consistent with content types associated with his persona, and so on.

The various resources 122 may be made freely available, (e.g., without authentication) or through account-based access. The resources 122 can include any suitable combination of services and/or content typically made available over a network by one or more providers. Some examples of services include, but are not limited to, a notification service (such as one that sends various types of notifications or recommendations to applications 108 and media content player 109), a content publisher service that distributes content, such as streaming videos and the like, to various computing devices, an advertising server service that provides advertisements to be used in connection with distributed content, a web development and management service, a collaboration service, a social networking service, a messaging service, and so forth. Content may include various combinations of assets, video comprising part of an asset, advertisements, audio, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of an example persona detection system in accordance with one or more embodiments.

Example Persona Detection System

Figure 2:
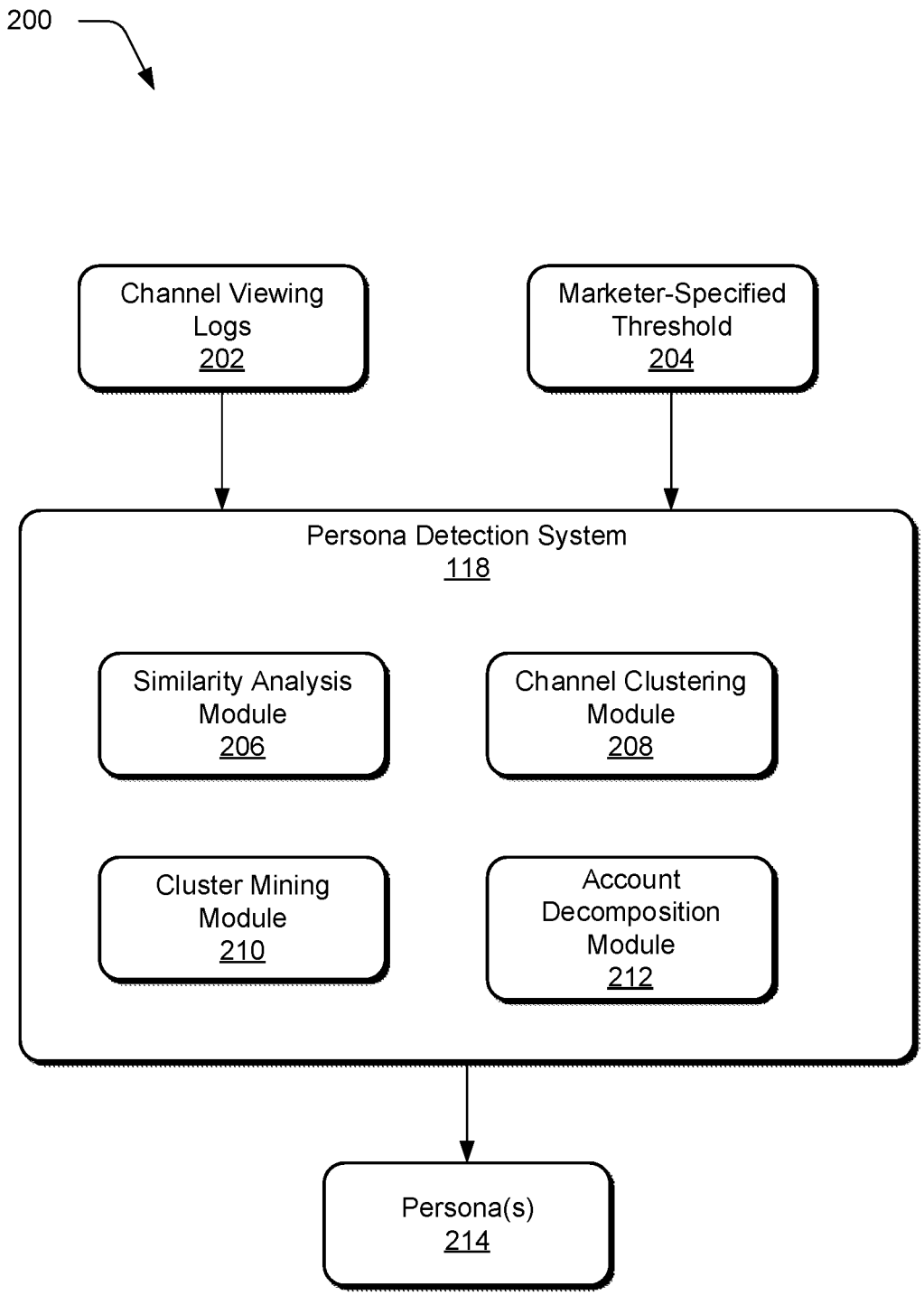
FIG. 2 illustrates an example persona detection system in accordance with one or more embodiments.

FIG. 2 illustrates an example environment 200 that includes a persona detection system 118 in accordance with one or more embodiments. In this example, the persona detection system receives, as input, channel viewing logs 202 and an optional marketer-specified threshold 204. The persona detection system 118 processes the channel viewing logs 202 and marketer-specified threshold 204 to output one or more personas 214 that can be used for particular accounts, as described below in more detail. The marketer-specified threshold 204 pertains to how many viewing patterns and hence, distinct personas, the marketer wishes to retain over all accounts in the system. For example, a marketer may deem 20 personas to be an adequate number given the relevant universe of channel selections. In such example, the marketer provides, as input to the persona detection system 118, a value of "20" as the number of personas that are to be output as personas 214. Other threshold values can be utilized without departing from the spirit and scope of the claimed subject matter. In some instances, multiple different thresholds can be used to provide different levels of granularity for channel recommendations. For example, in some instances, the universe of available channels may be small in number, e.g. 100 channels. In this case, a smaller threshold value, e.g., 10, can be provided. In other instances, the universe of available channels may be large in number, e.g., 1000 channels. In this case, a higher threshold value, e.g., 100, can be provided. The threshold values can be provided by way of a suitably configured user interface that comprises part of persona detection system 118. The channel viewing logs 202 pertains to logs that are maintained by a service provider, such as service provider 112 (FIG. 1). But one example of a channel viewing log is an authentication log such as one maintained by Adobe for Adobe Pass accounts, which enable users to participate viewing programs on tablets, smart phones, set-top boxes, game consoles and the like.

In the illustrated and described embodiment, the persona detection system 118 processes its inputs using a similarity analysis module 206, a channel clustering module 208, a cluster mining module 210, and an account decomposition module 212. The modules can be implemented in any suitable hardware, software, firmware, or combination thereof. In at least some embodiments, the modules are implemented as software that resides on a media content platform, such as media content platform 116 (FIG. 1).

In one implementation scenario, a comprehensive data set of channel viewing logs, also referred to as authentication logs, were utilized that includes over 8,000,000 accounts viewing 112 channels through different cable operators. Channel viewing logs need not be authentication logs, however. Authentication logs have an authentication feature that is used to authenticate users to an account. The accounts and channel viewing logs are maintained and reside in a database (e.g., database 124 of FIG. 1). The accounts are identified by a unique identifier which is consistent across time, devices, and channels.

The similarity analysis module 206 is representative of functionality that determines the similarity in viewing behavior for channel pairs over all accounts. In one or more embodiments, the similarity analysis module 206 uses the channel viewing logs to construct a first matrix F that indicates the frequency of video views of a channel c by an account u. The dimensions of the matrix are m by n, where m is the total number of accounts and n is the total number of channels. As an example, consider FIG. 3 which illustrates an example matrix F constructed by the similarity analysis module 206 in accordance with one embodiment. Each cell $f_{uc}$ in matrix F indicates the frequency of video views of channel, i.e., the number of times a channel c has been viewed by account u. Next, a similarity matrix M is created from matrix F.

The similarity matrix M is an n by n matrix, where each cell $m_{xy}$ represents the similarity between channel x and channel y. As an example, consider FIG. 4 which illustrates an example matrix M in accordance with one embodiment. In this example, the similarity between the channel x and channel y is the cosine similarity between the channels which is defined as:

$$m_{xy} = \text{Cosine Similarity (Channel } x\text{, Channel } y) = \frac{\sum (x_i y_i)}{\sqrt{\sum x_i^2 \sum y_i^2}}$$

Where—
$x_i = f_{ix}$
$y_i = f_{iy}$ $\bar{x} = \Sigma x_i / m$ $\bar{y} = \Sigma y_i / m$ $\Sigma$ is over i in the range [1,m]

A high positive cosine similarity value for a pair of channels indicates high similarity in viewing behavior for the channels over all of the accounts. On the other hand, a low cosine similarity value for a pair of channels indicates low similarity in viewing behavior for the channels over all accounts. Therefore, the cosine similarity captures the interests of the accounts by identifying the channels that are viewed together.

The channel clustering module 208 (FIG. 2) is representative of functionality that identifies all channels that have high similarities, e.g., high cosine similarities, as computed by the similarity analysis module 206. Any suitable clustering algorithm can be executed to cluster similar channels, such as hierarchical clustering techniques, e.g., agglomerative or divisive clustering techniques. As a result, the pairs of channels with high positive similarity are combined into a single cluster. These clusters define different co-occurring patterns from the frequency matrix F.

The cluster mining module 210 is representative of functionality that utilizes a frequent cluster mining approach to identify the commonly viewed patterns. In at least one embodiment, the cluster mining module 210 employs an Apriori algorithm for frequent cluster mining to identify viewing patterns. Apriori is an algorithm, known by those of skill in the art, for frequent item set mining and association rule learning over transactional databases. It proceeds by identifying the frequent individual items in the database and extending them to larger and larger item sets as long as those item sets appear sufficiently often in the database. The frequent item sets determined by cluster mining module 210, by way of the Apriori, can be used to determine association rules which highlight general trends in the database. The cluster mining module 210, in some embodiments, employs the frequent item sets to determine association rules, and utilizes those determined rules to highlight commonly viewed patterns. To date, frequent cluster mining has not been known to be used to enable identification of viewing patterns in the manner described in this document. More specifically, frequent cluster mining approaches utilize so-called "association rule learning" which is a method for discovering relations of interest between variables in large databases. It is intended to identify strong rules discovered in databases using some measures of what can be referred to as "interestingness." Frequent cluster mining can be better understood through an example. The cluster created using the similarity matrix might combine the sports channels in one viewing pattern="sports", whereas the cluster created due to high similarity between news channels might cluster the news channels into another "news" viewing pattern. However, if these two viewing patterns might co-occur together in many accounts (i.e. a measure of "interestingness"), the viewing patterns can be combined into one persona, as the viewing patterns represent a population interested in both the genres. This then corresponds to a persona in a shared account. By using frequent cluster mining to identify and combine viewing patterns to create personas within a shared account, more personalized channel recommendations can be made to individuals who share the account which, in turn, greatly improves the user experience over the past approaches which employed only account level recommendations. This is because account level recommendations typically just make recommendations for the account based on channels the account has viewed, whereas personas enable a finer level of granularity aimed at individuals who share the account.

One input the frequent cluster mining approach takes into account is the marketer-specified threshold 204 (FIG. 2), which essentially defines the number of personas the marketer wishes to use over all accounts. Using a marketer-specified threshold in connection with the frequency cluster mining approach in the context of persona-based channel recommendations is a further innovation which improves the user experience and provides the marketer with a degree of control over the persona creation process. In the above discussion, the marketer may have decided that a total of 20 personas would suffice for its purposes.

The account decomposition module 212 is representative of functionality that decomposes a shared account into personas using a frequency reduction technique. Specifically, after extracting the common viewing patterns or personas as just described, the account decomposition module decomposes individual accounts into personas. In some embodiments, the account decomposition module 212 decomposes individual accounts into personas using the frequency reduction technique. In one or more embodiments, the account decomposition module 212 performs the decomposition by employing a greedy approach described just below. In the approach described just below, cardinality of a persona refers to the number of channels viewed by the persona.

```
for every account id
    1.  Identify different clusters of channels viewed by the account
    2.  for every persona in decreasing order of cardinality
            if the Channels from the persona are viewed by the account
            ID
            then
                a.  Add persona to the decomposition
                b.  Remove channels of the persona from
                    account
            end
    3.  Output personas for the account
end
```

The above-described approach first identifies different clusters of channels viewed by an account. The approach considers all of the personas which have been discovered and, if the channels of a particular persona have been viewed by this account, then this persona is added to the decomposition and the channels of the persona are removed from the account so the process can be repeated. The module 212 then outputs the personas for the account and saves one or more of the personas in an account profile that corresponds to those personas.

The above-described decomposition is "greedy" as the personas are taken in decreasing order of cardinality. A "greedy" approach is an approach that follows the problem solving heuristic of making the locally optimal choice at each stage with the hope of finding a global optimum. A "greedy" approach may yield locally optimal solutions that approximate a global optimal solution in a reasonable time, as will be appreciated by the skilled artisan. To illustrate the need for this, if the following cluster sets are identified as personas—{{A}, {B}, {A, B}}, the accounts which contribute to the third set also contribute to the first two sets and, for such accounts, {A, B} must be counted as one persona rather than two separate personas.

Figure 5:
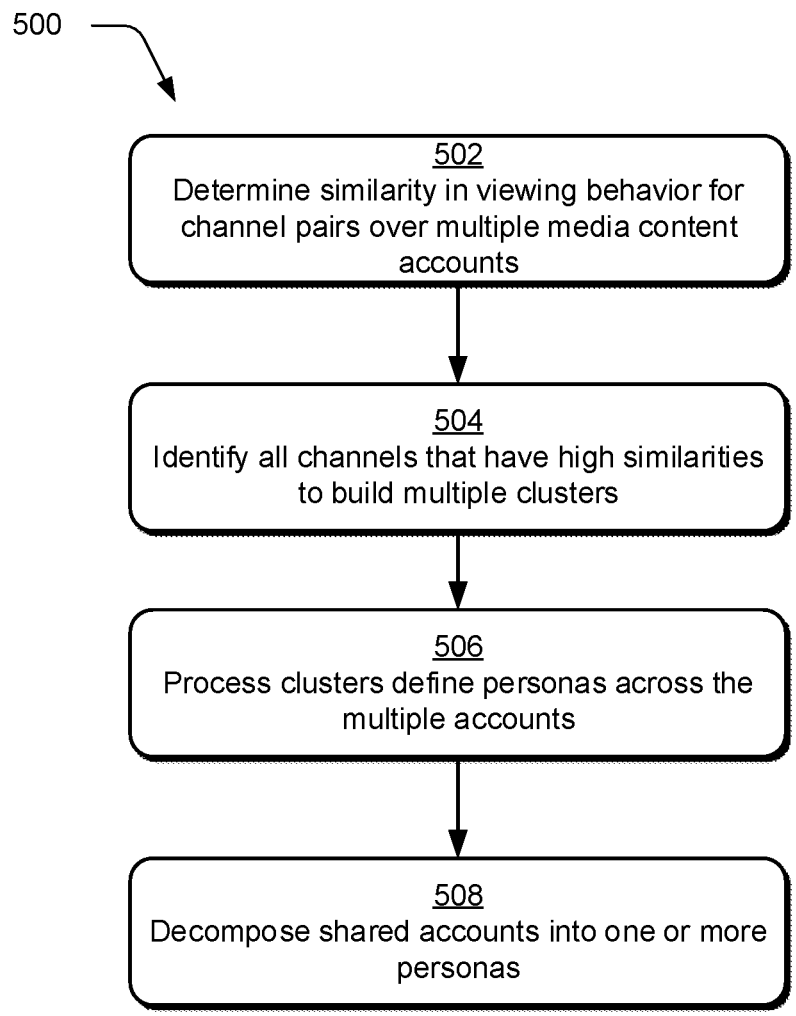
FIG. 5 is a flow diagram that describes operations in a method in accordance with one or more embodiments.

FIG. 5 describes an example procedure 500 for detecting personas within an account in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device of service provider 112 of FIG. 1 that makes use of a media content platform 116, such as that described above.

At block 502, the similarity in viewing behavior for channel pairs over multiple media content accounts is determined. This operation can be performed in any suitable way. For example, in one or more embodiments, a matrix can be constructed that provides, for each of multiple media content accounts, a frequency of video views for each channel of a collection of multiple channels. An example of how this can be done is shown and described in relation to FIG. 3. Next, the constructed matrix can be processed to provide a similarity matrix which provides a similarity value for pairs of channels making up the collection of multiple channels. Any suitable type of similarity analysis can be utilized an example of which is to utilize the cosine similarity between individual pairs of channels. An example of how this can be done is shown and described in relation to FIG. 4.

Next, at block 504, all channels that have high similarities are identified and used cluster channels to build multiple clusters. A "high" similarity is a relative term and can be defined by a threshold value that is appropriate for the type of similarity analysis that was conducted to build the similarity matrix. In at least some embodiments, this operation can be performed by utilizing a hierarchical clustering approach such as the one described above. At block 506, the clusters are processed to define personas across the multiple accounts. In at least some embodiments, the personas can be identified by employing a cluster mining approach, such as the one described above. Each persona pertains to a commonly viewed pattern, examples of which are provided above.

At block 508, each account is decomposed into one or more personas. For accounts that are shared, decomposing the shared account into multiple personas facilitates experience individualization by providing a more accurate and more granular perspective of individuals who use the shared account.

Having considered an example persona detection system in accordance with one or more embodiments, consider now an example recommendation system in accordance with one or more embodiments.

Example Recommendation System

Figure 6:
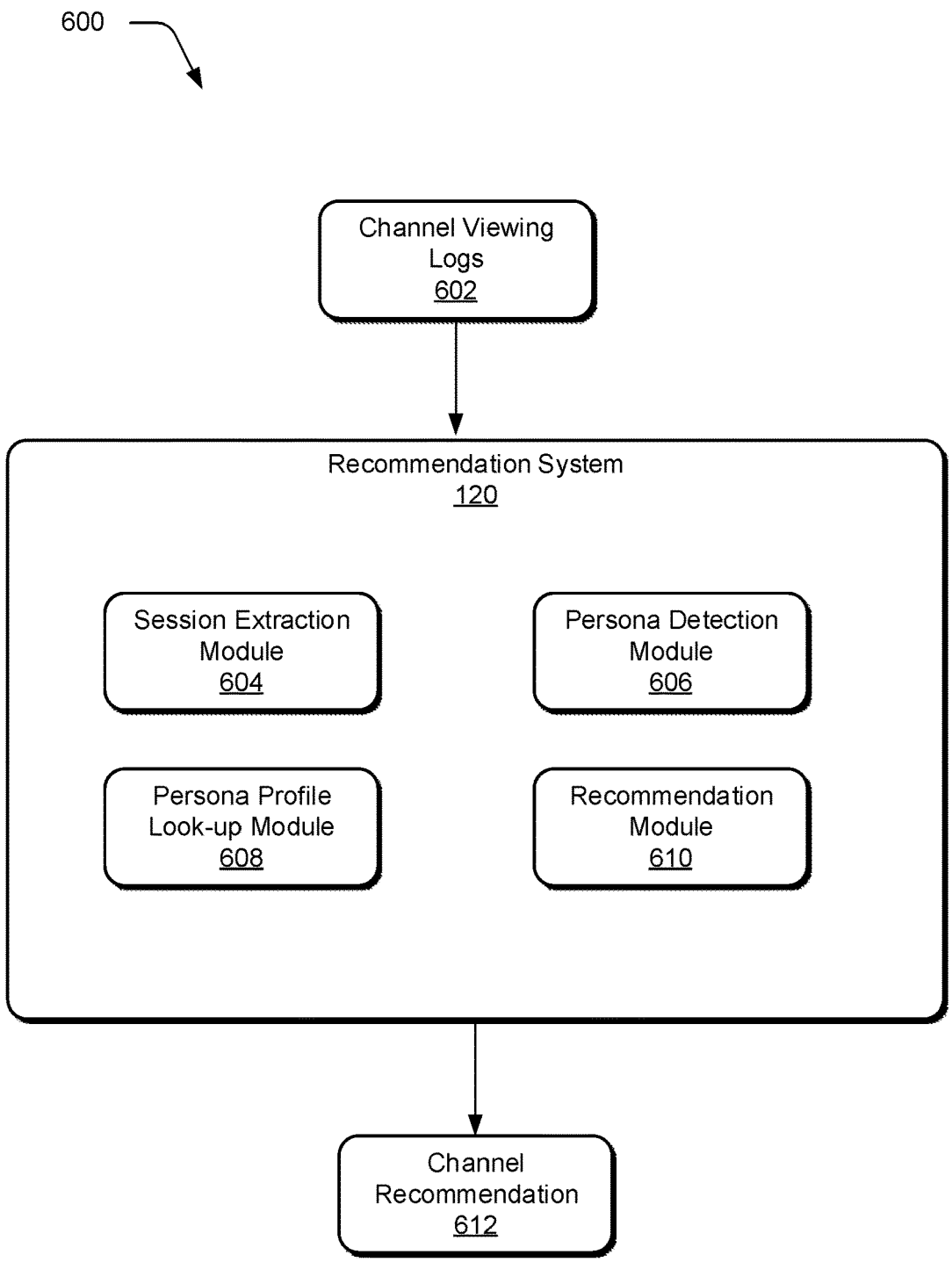
FIG. 6 illustrates an example recommendation system in accordance with one or more embodiments.

FIG. 6 illustrates an example environment 600 that includes a recommendation system 120 in accordance with one or more embodiments. In this example, the recommendation system receives, as input, channel viewing logs 602 for the current session. The recommendation system 120 processes the channel viewing logs 602 to output one or more channel recommendations 612 for a particular persona.

In the illustrated and described embodiment, the recommendation system 120 processes its input using a session extraction module 604, a persona detection module 606, a persona profile look-up module 608, and a recommendation module 610. These modules can be implemented using any suitable hardware, software, firmware, or combination thereof. In at least some embodiments, these modules are implemented as software that resides on a media content platform, such as media content platform 116 (FIG. 1).

The session extraction module 604 is representative of functionality that ascertains that a viewing session has started so that channel recommendations can be made. For accounts that are shared by multiple personas, an assumption is made that any particular session is driven by a persona. This is because even when multiple users with different interests share an account, usually a session is "owned" by a particular individual which involves viewing channels of his or her interest during the time period of that session. Here, a session is defined as a period of channel viewing activity until no activity is observed for the account for an hour. For example, the kids in a particular household might use the shared household account to watch cartoons channels in a session, whereas the sports enthusiasts might use the same account to view a tennis match. Thus, a hypothesis upon which the various innovations are described is that a session is driven by persona-based preferences. Based upon this, a persona-based recommendation system can be built.

The persona detection module 606 is representative of functionality that enables the persona-based recommendation system to be implemented. In at least some embodiments, the persona detection module 606 recognizes which persona profile should be leveraged for a particular recommendation. In order to do this, the above-mentioned hypothesis is leveraged in that one session is generally owned by only one of the personas sharing an account. Therefore, the first channel viewed by an account in a session is used to identify the persona that owns the session. This can include discarding the channel that is initially on when a media content player is activated or the computing device is turned on. This can also include discarding any initial channels that are quickly changed in favor of a channel that is left on for a long period of time. For example, when the computing device is turned on, a previous channel from a previous session may be quickly changed to a new channel for the current session. This new channel would then serve as the "first channel viewed" by the shared account. Thus, when the "first channel viewed" is ascertained, the media content platform can be notified and the persona profiles for that particular account can be processed to identify one or more personas that include that channel. If this channel belongs to more than one persona, any one of the personas can be chosen randomly.

The persona profile look-up module 608 is representative of functionality that enables persona profiles to be looked up for purposes of enabling channel recommendations. In some instances, the persona profiles may be included locally on the computing device such that once a persona profile is ascertained, the profile can be communicated to the media content platform which can then make appropriate recommendations. In other instances, the persona profiles may be included on the media content platform such that when the "first channel viewed" is ascertained, the media content platform can be notified of the first channel viewed and can then ascertained from its database one or more personas that include that channel.

The recommendation module 610 is representative of functionality that enables channel recommendations to be presented on the computing device. That is, once a persona is identified, the media content platform can cause channel recommendations 612 to be communicated to the user's computing device and be presented by way of a suitable user interface.

Figure 7:
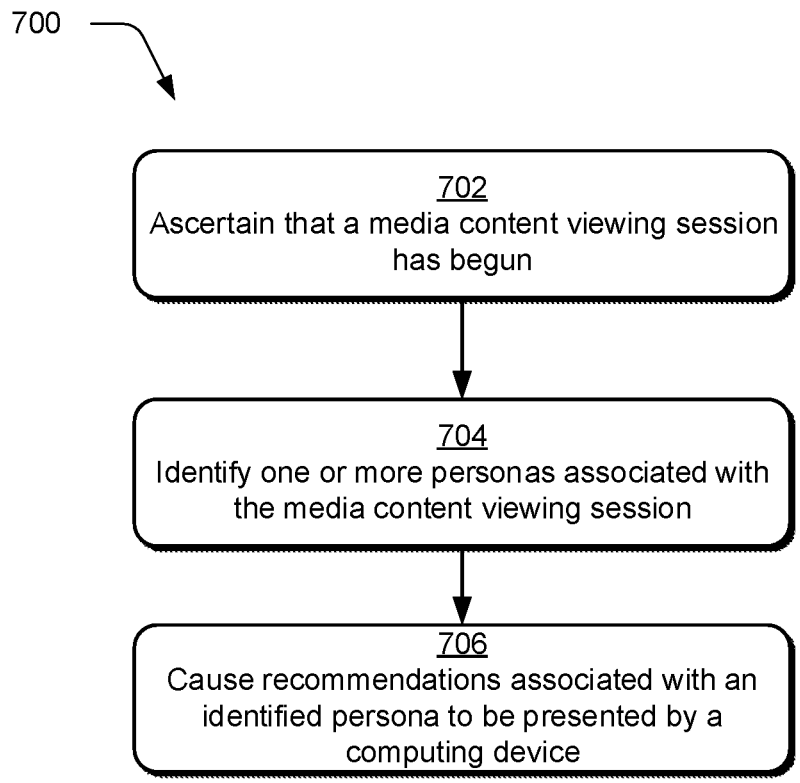
FIG. 7 is a flow diagram that describes operations in a method in accordance with one or more embodiments.

FIG. 7 describes an example procedure 700 for implementing a persona-based channel recommendation system. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device of service provider 112 of FIG. 1 that makes use of a media content platform 116, such as that described above.

At block 702, a media content viewing session is ascertained to have begun. This can be performed in any suitable way. For example, this can be performed by a computing device notifying, or otherwise authenticating to, a media content platform. Once a media content viewing session has begun, one or more personas associated with the media content viewing session are identified at block 704. This can be performed in any suitable way. In at least some embodiments, this is performed automatically, without requiring a user to select a persona. For example, the computing device on which the media content viewing session has begun can ascertain a first channel viewed by an account. This can be the actual first channel appearing on the computing device when the device or a corresponding media player is turned on. Alternately or additionally, the first channel viewed can be the first channel that is viewed for a particular time duration, e.g., 15 minutes or more. The first channel viewed can then be communicated to the media content platform. Once the first channel viewed has been ascertained, one or more personas associated with the first channel viewed can be identified. This can be done by looking for persona profiles for the particular account that include the first channel viewed. Once the persona has been ascertained or identified, channel recommendations associated with the identified persona can be caused to be presented by the computing device (block 706). This can be performed by, for example, the media content platform communicating channel recommendations to the computing device. These channel recommendations can be recommendations included in the particular persona's profile. Alternately or additionally, the channel recommendations can be for channels that are similar to channels that appear in the particular persona's profile. For example, a user interface experience may present recommendations in the form of "We see that you viewed the Disney channel, you might like ABCFamily Channel as well.

Having considered various embodiments for decomposing media content accounts for persona-based experience individualization, consider now an example system and device that can be utilized to practice the inventive principles described herein.

Example System and Device

Figure 8:
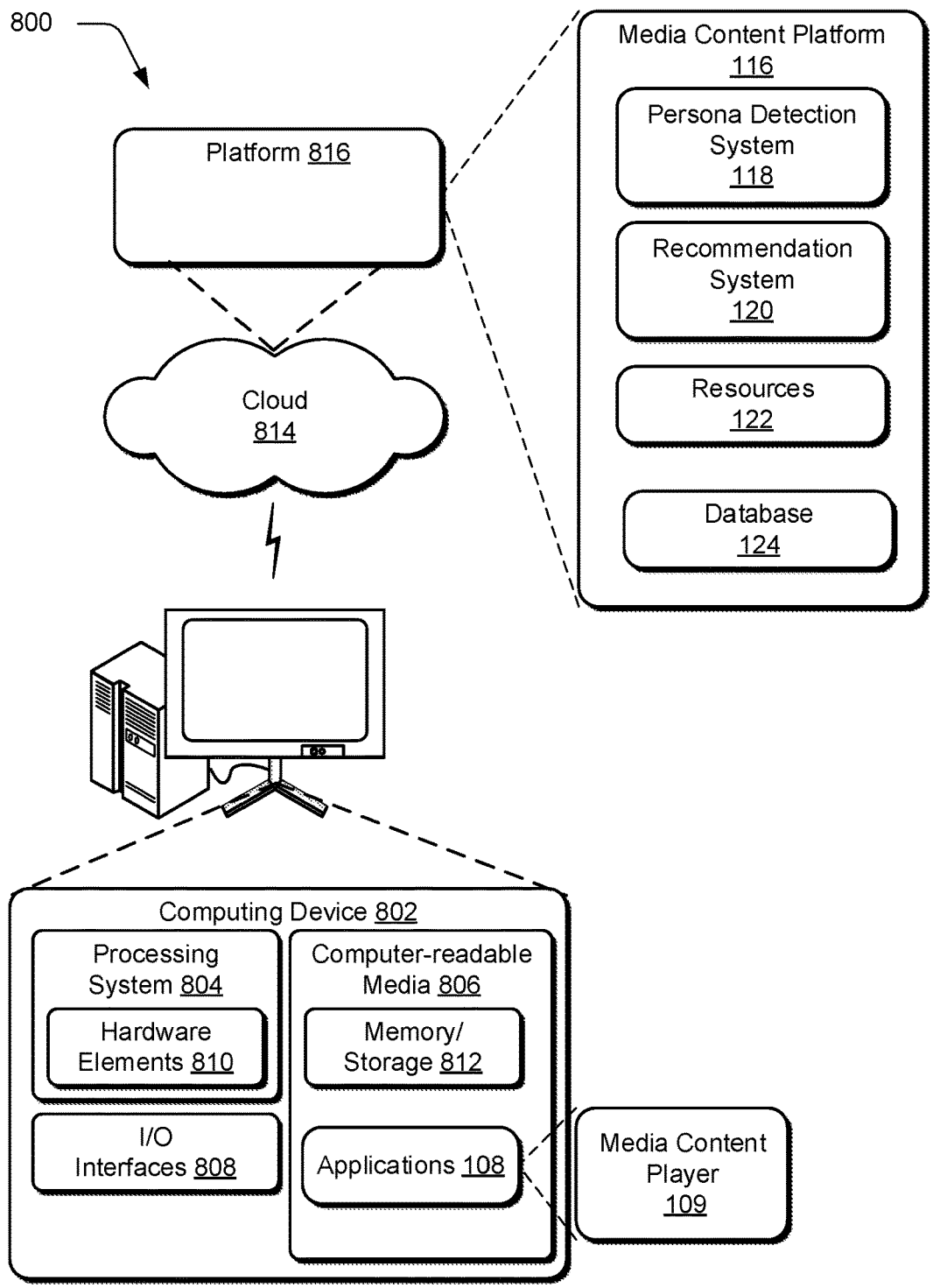
FIG. 8 illustrates an example system including various components of an example device that can be employed for one or more search implementations described herein.

FIG. 8 illustrates an example system generally at 800 that includes an example computing device 802 that is representative of one or more computing systems and/or devices that may implement the various techniques described herein. This is illustrated through inclusion of the applications 108 and, in particular, media content player 109, which operates as described above. The computing device 802 may be, for example, a server of a service provider, a device associated with a client (e.g., a client device), an on-chip system, and/or any other suitable computing device or computing system.

The example computing device 802 is illustrated as including a processing system 804, one or more computer-readable storage media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable storage media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable storage media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 that can include a media content platform 116 including persona detection system 118, recommendation system 120 and resources 122 as described above. The platform 816 abstracts underlying functionality of hardware (e.g., servers) and software resources of the cloud 814. The resources may include applications and/or data that can be utilized while computer processing is executed on servers that are remote from the computing device 802. Resources can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources that are implemented via the platform 816. Accordingly, in an interconnected device implementation, implementation of functionality described herein may be distributed throughout the system 800. For example, the functionality may be implemented in part on the computing device 802 as well as via the platform 816 that abstracts the functionality of the cloud 814.

CONCLUSION

Various embodiments disambiguate users who share media content accounts to provide persona-based experience individualization. Personas correspond to commonly observed channel watching patterns among media content customers. Decomposition of the media content account into personas is achieved by analyzing many accounts, e.g., millions of accounts, on media content platforms. By analyzing accounts, a recommendation system can individualize the channel watching experience in media content accounts.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for improved channel recommendations, a method comprising:
constructing, by a computing device, a first matrix indicating a frequency of video views for each channel of a collection of multiple channels by each of multiple media content accounts of a media content platform, the media content platform providing media content to users of the multiple media content accounts;
determining, by the computing device, a similarity in viewing behavior for channel pairs over the multiple media content accounts based on the first matrix, said similarity being determined based on a similarity value for each channel pair;

clustering, by the computing device, channels to create multiple clusters of channels by identifying channel pairs having similarity values above a threshold value;

processing, by the computing device, the multiple clusters to define personas across the multiple media content accounts, wherein each persona pertains to a common channel watching pattern; and decomposing, by the computing device, each of the multiple media content accounts into at least one persona, the persona being usable to facilitate channel recommendations.

2. The method as described in claim 1, wherein said determining comprises generating a similarity matrix that provides a similarity value for pairs of channels of the collection of multiple channels, said generating including processing the frequency of video views from the first matrix to provide the similarity value for the pairs of channels of the collection of multiple channels.

3. The method as described in claim 2, wherein processing the frequency of video views from the first matrix comprises computing a cosine similarity between the pairs of channels of the collection of multiple channels.

4. The method as described in claim 1, wherein said clustering comprises executing a hierarchical clustering approach.

5. The method as described in claim 1, wherein processing the multiple clusters to define the personas across the multiple media accounts comprises executing a cluster mining approach.

6. The method as described in claim 1, wherein processing the multiple clusters to define personas across the multiple media accounts comprises executing a frequent cluster mining approach.

7. The method as described in claim 1, wherein processing the multiple clusters to define personas across the multiple media accounts comprises executing a frequent cluster mining approach and using a marketer-specified threshold to define a number of personas to use over all multiple media content accounts.

8. The method as described in claim 1, wherein decomposing each of the multiple media content accounts into at least one persona comprises executing a frequency reduction technique.

9. The method as described in claim 1, wherein said decomposing each of the multiple media content accounts into at least one persona comprises, for each media content account:

identifying different clusters of channels viewed by the media content account; and for every defined persona across the multiple media content accounts in decreasing order of a number of channels viewed by a persona:

if the channels from a defined persona are viewed by the media content account, adding the defined persona to an associated decomposition, outputting the defined persona for the media content account, and saving the defined persona as part of an account profile.

10. In a digital medium environment for improved channel recommendations, at least one computer-readable storage media having instructions that are stored thereon which are executable by a computing device to perform operations comprising:

ascertaining, by the computing device, that a media content viewing session has begun for a media account;

identifying, by the computing device, at least one persona associated with the media content viewing session, wherein each persona pertains to a common channel watching pattern, and wherein for at least some media accounts with different users, each different user is assigned a different persona, wherein said identifying is performed automatically without requiring a user to select a persona; and causing, based on said at least one persona associated with the media content viewing session and by the computing device, at least one channel recommendation to be presented on a computing device on which the media content viewing session has begun, the at least one channel recommendation being based on:

determining a similarity in viewing behavior for channel pairs over multiple media content accounts of a media content platform that provides media content to users of the multiple media content accounts, said similarity being based on a similarity value between channels for each channel pair;

clustering the channel pairs into multiple clusters of channels by identifying channel pairs having similarity values above a threshold value;

defining personas across the multiple media content accounts based on the multiple clusters, the defined personas pertaining to a respective common channel watching pattern; and associating at least one of the defined personas with said at least one persona associated with the media content viewing session.

11. The at least one computer-readable storage media as described in claim 10, wherein said ascertaining comprises receiving, at the media content platform, a notification from the computing device on which the media content viewing session has begun, that a media content viewing session has begun.

12. The at least one computer-readable storage media as described in claim 10, wherein said identifying at least one persona comprises:

ascertaining a channel viewed by the corresponding media account; and responsive to said ascertaining said channel viewed, identifying said at least one persona from a persona profile associated with the corresponding media account.

13. The at least one computer-readable storage media as described in claim 10, wherein said causing a recommendation to be presented comprises causing a recommendation of a channel included in a profile of said at least one persona to be presented.

14. A system implemented in a digital medium environment in which a media content platform is configured to make channel recommendations, the system comprising:

a processing system;

at least one computer readable media storing instructions, executable via the processing system, to implement an improved channel recommendation technique by performing operations comprising:

constructing a first matrix indicating a frequency of video views for each channel of a collection of multiple channels by each of multiple media content accounts of the media content platform, the media content platform providing media content to users of the multiple media content accounts;

determining, based on the first matrix, similarity in viewing behavior for channel pairs over the multiple media content accounts of the media content platform, said similarity being determined based on a similarity value for each channel pair;

clustering channels to create multiple clusters of channels by identifying channel pairs having similarity values above a threshold value;

processing the multiple clusters to define personas across the multiple media content accounts, wherein each persona pertains to a common channel watching pattern; and decomposing each of the multiple media content accounts into at least one persona, the persona being usable to facilitate channel recommendations.

15. The system as described in claim 14, wherein said determining further comprises:

generating a similarity matrix that provides a similarity value for pairs of channels of the collection of multiple channels, said generating including processing the frequency of video views from the first matrix to provide the similarity value for the pairs of channels of the collection of multiple channels.

16. The system as described in claim 15, wherein processing the frequency of video views from the first matrix comprises computing a cosine similarity between the pairs of channels of the collection of multiple channels.

17. The system as described in claim 14, wherein said clustering comprises executing a hierarchical clustering approach.

18. The system as described in claim 14, wherein processing the multiple clusters to define the personas across the multiple media accounts comprises executing a cluster mining approach.

19. The system as described in claim 14, wherein processing the multiple clusters to define personas across the multiple media accounts comprises executing a frequent cluster mining approach.

20. The system as described in claim 14, wherein decomposing each of the multiple media content accounts into at least one persona comprises executing a frequency reduction technique.

* * * * *